US010580021B2

(12) United States Patent
Bagwell et al.

(10) Patent No.: US 10,580,021 B2
(45) Date of Patent: Mar. 3, 2020

(54) PRODUCT OFFERING ANALYTICS

(71) Applicant: International Business Machines Corporation, Armonk, NY (US)

(72) Inventors: Derek P. Bagwell, Rochester, MN (US); Ivory W. Knipfer, Rochester, MN (US); William R. Taylor, Rochester, MN (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 15/211,548

(22) Filed: Jul. 15, 2016

(65) Prior Publication Data

US 2016/0321685 A1  Nov. 3, 2016

Related U.S. Application Data

(63) Continuation-in-part of application No. 13/415,272, filed on Mar. 8, 2012, now abandoned, which is a
(Continued)

(51) Int. Cl.
*G06Q 30/02* (2012.01)
*G06Q 10/08* (2012.01)
(Continued)

(52) U.S. Cl.
CPC ......... *G06Q 30/0202* (2013.01); *G06Q 10/04* (2013.01); *G06Q 10/087* (2013.01);
(Continued)

(58) Field of Classification Search
CPC ............ G06Q 10/087; G06Q 30/0621; G06Q 30/0633; G06F 15/7807
(Continued)

(56) References Cited

U.S. PATENT DOCUMENTS 6,889,197 B2   5/2005  Lidow
7,516,088 B2   4/2009  Johnson et al.
(Continued)

FOREIGN PATENT DOCUMENTS

WO   2009079361   6/2009
WO   2010004587   1/2010

OTHER PUBLICATIONS

Davidsson et al., Multi Agent Based Simulation of Transport Chains, Proceedings of 7th International Conference on Autonomous Agents and Multiagent Systems (AAMAS 2008), May 12-16, 2008, pp. 1153-1160.
(Continued)

*Primary Examiner* — Johnna R Loftis
(74) *Attorney, Agent, or Firm* — Lieberman & Brandsdorfer, LLC

(57) ABSTRACT

Embodiments of the invention relate to supply chain recommendations and application in real-time. A correlation between order proposals and firm orders is provided, and a correlation between the proposals and orders is measured in the form of compliance. A command associated with a measurement of the compliance is generated and applied to one or more hardware addressable components or associated machines. The application of the commands changes a physical aspect of the product, thereby effectively transforming a state of the product.

20 Claims, 10 Drawing Sheets

Related U.S. Application Data continuation of application No. 13/342,246, filed on Jan. 3, 2012, now abandoned.

(51) Int. Cl.
*G06Q 30/06* (2012.01)
*G06Q 10/04* (2012.01)

(52) U.S. Cl.
CPC ..... *G06Q 30/0201* (2013.01); *G06Q 30/0621* (2013.01); *G06Q 30/0633* (2013.01)

(58) Field of Classification Search
USPC ...................................................... 705/7.31
See application file for complete search history.

(56) References Cited

U.S. PATENT DOCUMENTS

| | | | |
|---|---|---|---|
| 7,768,404 | B2 | 8/2010 | Flores et al. |
| 2002/0069079 | A1 | 6/2002 | Vega |
| 2002/0133368 | A1* | 9/2002 | Strutt ................ G06Q 10/063 705/7.11 |
| 2002/0169657 | A1 | 11/2002 | Singh et al. |
| 2004/0064350 | A1 | 4/2004 | Hanazato et al. |
| 2004/0088211 | A1 | 5/2004 | Kakouros et al. |
| 2004/0193496 | A1 | 9/2004 | Hirota |
| 2005/0131800 | A1 | 6/2005 | Parks et al. |
| 2005/0177435 | A1 | 8/2005 | Lidow |
| 2007/0050235 | A1 | 3/2007 | Duimet |
| 2007/0214433 | A1 | 9/2007 | Kamino |
| 2007/0219959 | A1 | 9/2007 | Kanemasa |
| 2008/0103946 | A1 | 5/2008 | Johnson et al. |
| 2008/0275795 | A1 | 11/2008 | Murugan |
| 2008/0306783 | A1 | 12/2008 | Yee et al. |
| 2010/0057531 | A1 | 3/2010 | Bagwell et al. |
| 2010/0125489 | A1 | 5/2010 | Surendra |
| 2010/0153241 | A1 | 6/2010 | Rucker et al. |
| 2010/0274601 | A1* | 10/2010 | Bagwell ............... G06Q 10/087 705/7.29 |
| 2011/0313750 | A1 | 12/2011 | Song |
| 2011/0320319 | A1 | 12/2011 | Streich |
| 2013/0018696 | A1 | 1/2013 | Meldrum |
| 2013/0211870 | A1 | 8/2013 | Lawson et al. |

OTHER PUBLICATIONS

Berkeley Student Cooperative, Request for Proposals Information Technology Assessment and Planning, Berkeley Student Cooperative, Oct. 16, 2008.
Proposal for Management Integration and Book-to-Bank System, Google, 2007.
Mumel et al., How Marketing Communications Correlates with Business Performance, Journal of Applied Business Research—Second Quarter 2007, vol. 23, No. 2, Google 2007.
Rensselaer Polytechnic Institute, Request for Proposal Data Warehousing—Business Intelligence Tool, Nov. 2001.
Marketing Science, "Modeling DVD Preorder and Sales: An Optimal Stopping Approach," V. 27, n. 6, Nov. 2008, p. 1097.
Fair Disclosure Wire, "Q2 2010 Franklin Electric Earnings Conference Call—Final," CQ Roll Call, Waltham, United State, Aug. 2, 2010.
List of IBM Patents or Applications Treated as Related, Jul. 2016.

* cited by examiner

| | | Proposal Data | | | | Order Data | | |
|---|---|---|---|---|---|---|---|---|
| Filter ID | Product/Feature | Channel Type / Customer | Geo/Country | Window | Product/Feature | Channel Type / Customer | Geo/Country | Window |
| F-001 | */2356 | BP | ALL | 10/09 - 11/09 | */2356 | BP | *ALL | 12/1/09 - 12/31/09 |
| F-002 | ALL | High Power Servers Inc" | ALL | 1/1/09 - 6/30/09 | ALL | High Power Servers Inc" | *ALL | 1/1/09 - 6/30/09 |
| F-003 | Servers | ALL | ALL | 1/1/09 - 3/31/09 | Servers | ALL | AP | 4/1/09 - 6/30/09 |
| F-004 | 94065702 and 94073421 | ALL | ALL | Jan 2010 | 94065702 and 94073422 | ALL | ALL | 1/15/10 - 2/15/10 |
| F-005 | 3402R4510 with Linux OS | ALL | ALL | 4/1/09 - 6/30/09 | 3402R4510 with Linux OS | ALL | ALL | July 2009 |

FIG. 2

| Comp ID | Filter ID | Compliance Algorithm | Action |
|---|---|---|---|
| C-001 | F-001 | Order percentage < 50% | Email ($ProdDev, Chart=WeeklyLoad) |
| C-002 | F-002 | Proposal to order lead time > 2 weeks | Email Alert ($ProdMktg, Order=LT.2weeks) |
| C-003 | F-001 | Average qty of storage in proposals and orders | Email Chart ($ ST qty) |
| C-004 | F-005 | Proposal-Order Lead times where value > 5 million | Email (List $Order#, $Order-date) |
| C-005 | F-003 | Average percent decrease firm order value | Select address of CPUs and set to inactive state |

FIG. 3

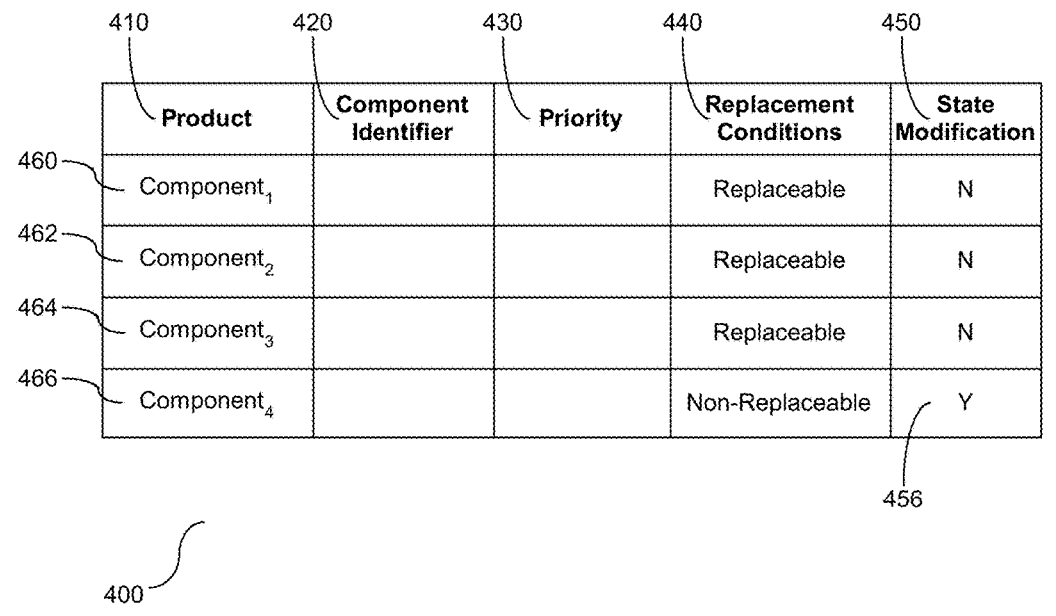

|  | Product | Component Identifier | Priority | Replacement Conditions | State Modification |
|---|---|---|---|---|---|
| 460 | Component₁ |  |  | Replaceable | N |
| 462 | Component₂ |  |  | Replaceable | N |
| 464 | Component₃ |  |  | Replaceable | N |
| 466 | Component₄ |  |  | Non-Replaceable | Y |

FIG. 4

PRODUCT OFFERING ANALYTICS

CROSS REFERENCE TO RELATED APPLICATION(S)

The present application is a continuation-in-part of U.S. patent application Ser. No. 13/415,272, now pending, which is a continuation of U.S. patent application Ser. No. 13/342,246, now pending, both of which are hereby incorporated by reference.

BACKGROUND

Technical Field

The present invention relates to a system, computer program product, and method for correlating data in a product supply chain. More specifically, the invention relates to application of the correlation data to a product or product component configuration, and transforming a state of the associated product based on the correlation data.

It is understood that many products are comprised of a combination of components that function as a whole to support the product. When configuring a product, it is important that the components of the product be compatible to support the product configuration and functionality. Product components are selected for various reasons, including pre-requisites, co-requisites, sales influence, etc. Accordingly, compatibility of the selected components is critical to support the final product.

SUMMARY OF THE INVENTION

The embodiment includes a system, computer program product, and method for supply chain analysis that provides real-time solutions to a supply chain based upon product proposal and product order data, and application of the solution to a product state.

In one aspect, the system, computer program product, and method select or otherwise identify a product for manufacture. The product is configured with at least two addressable components, with each component having an initial setting. Proposal data is organized with product order proposals and firm order data is associated with firm product orders. The proposal data includes proposed configuration data of at least one of the addressable hardware components, and the firm order data includes orders received data including component setting data for each of the two or more addressable hardware components. A correlation between the order proposal and the firm order data is produced, and compliance data according to specified criteria based on the correlation is measured. A command is generated for each of the addressable hardware components based on the measured compliance data. The generated command is applied to the product, thereby setting one or more components based on the measured compliance, and effectively creating the product in a state with the identified configuration.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

FIG. 2 depicts a block diagram illustrating an example of filter models.

FIG. 3 depicts a block diagram illustrating examples of compliance models

FIG. 4 depicts a block diagram illustrating a chart for replacement models.

DETAILED DESCRIPTION

Figure 1:
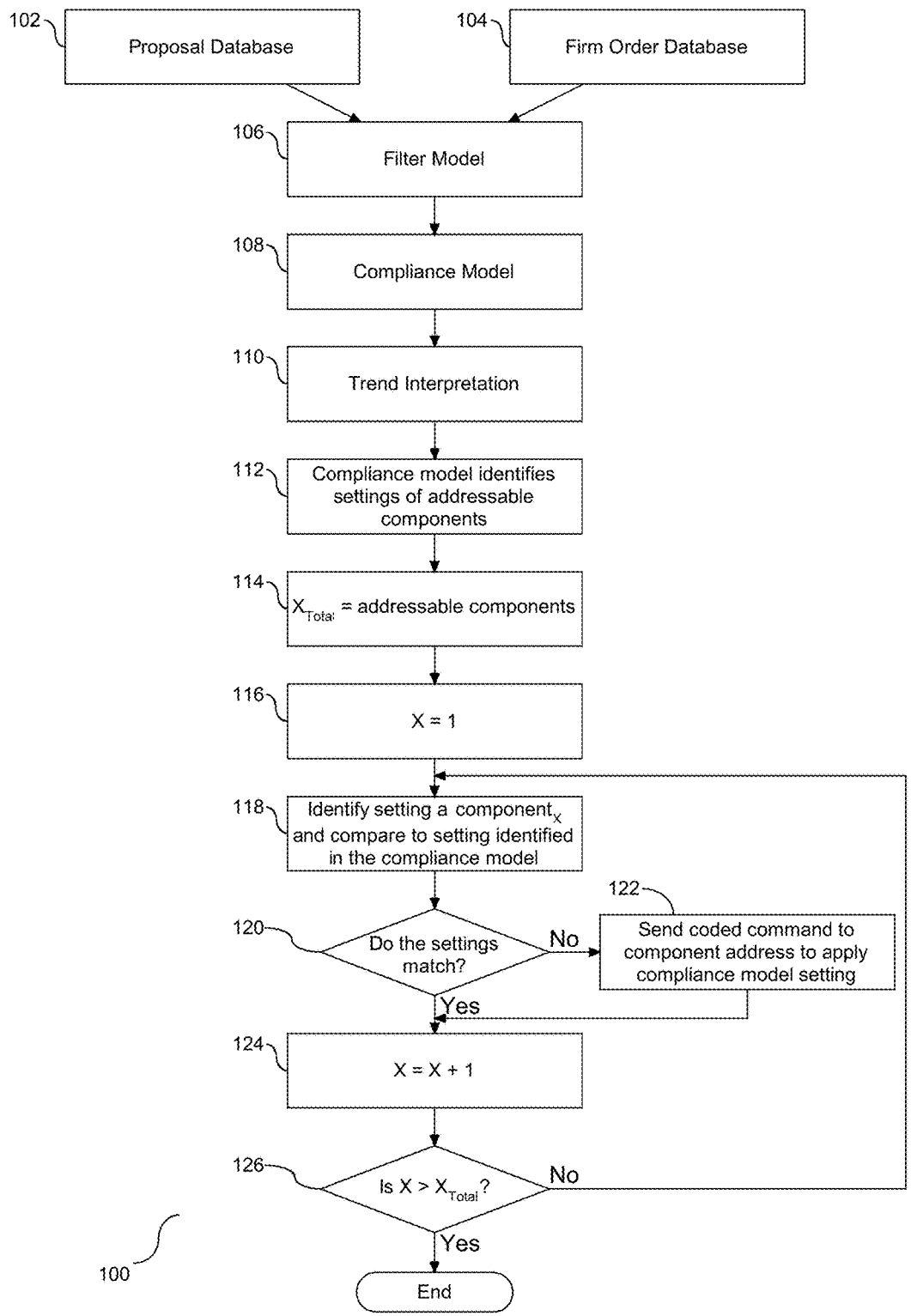
FIG. 1 depicts a flow chart illustrating a process for analyzing proposal data with respect to a trending flow of product backlog.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, models, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Sales and marketing of products is a dynamic function that brings a product to market. One challenge associated with product sales is product inventory and the cost of maintaining the inventory. There are various factors that contribute to product inventory, and the goal is to address one or more of these factors. Correlating proposal data to real order and historical shipments provides insight into trends and patterns. More specifically, comparison of product configuration proposals with order backlog data in real-time provides insight together with supply chain actions to reduce inventory. Such actions include, but are not limited to, price changes, supply adjustments, product reductions, withdrawals, etc. Accordingly, a real-time solution that addresses order backlog functions to align the supply of the product with the demand for the product.

FIG. 1 is a flow chart (100) illustrating a process for analyzing proposal data with respect to a trending flow of product backlog. There are two data elements that feed into the functionality demonstrated in the flow chart, including a database of proposal data (102) and a database of firm orders (104). The proposal database (102) organizes and stores data pertaining to all proposals created, including the time when the proposals were submitted and product content. The firm order database (104) organizes and stores data pertaining to firm orders received from customers, including all orders received and the time when the orders were received. Data from both of the first and second databases (102) and (104), respectively, are received as input by a filter model (106) which functions to trim data in the databases to pertinent data selected for consideration. More specifically, the filter model (106) parses the proposal data according to product and time, and parses the firm order data according to order characteristics. Details of the filter models are shown in FIG. 2 and described below in detail. Accordingly, the filter models function to prune data present in both the proposal and firm order databases.

The pruned data emanating from step (106) is subjected to a compliance model (108), which measures trends as they emerge from a proposal. Details of the compliance model are shown in FIG. 3 and described below in detail. The trends as identified by the compliance model are subject to interpretation (110) so that the trends may be appropriately acted upon. More specifically, the identified trends enable a measured correlation provided by the compliance model to be applied to supply chain changes.

Figure 7:
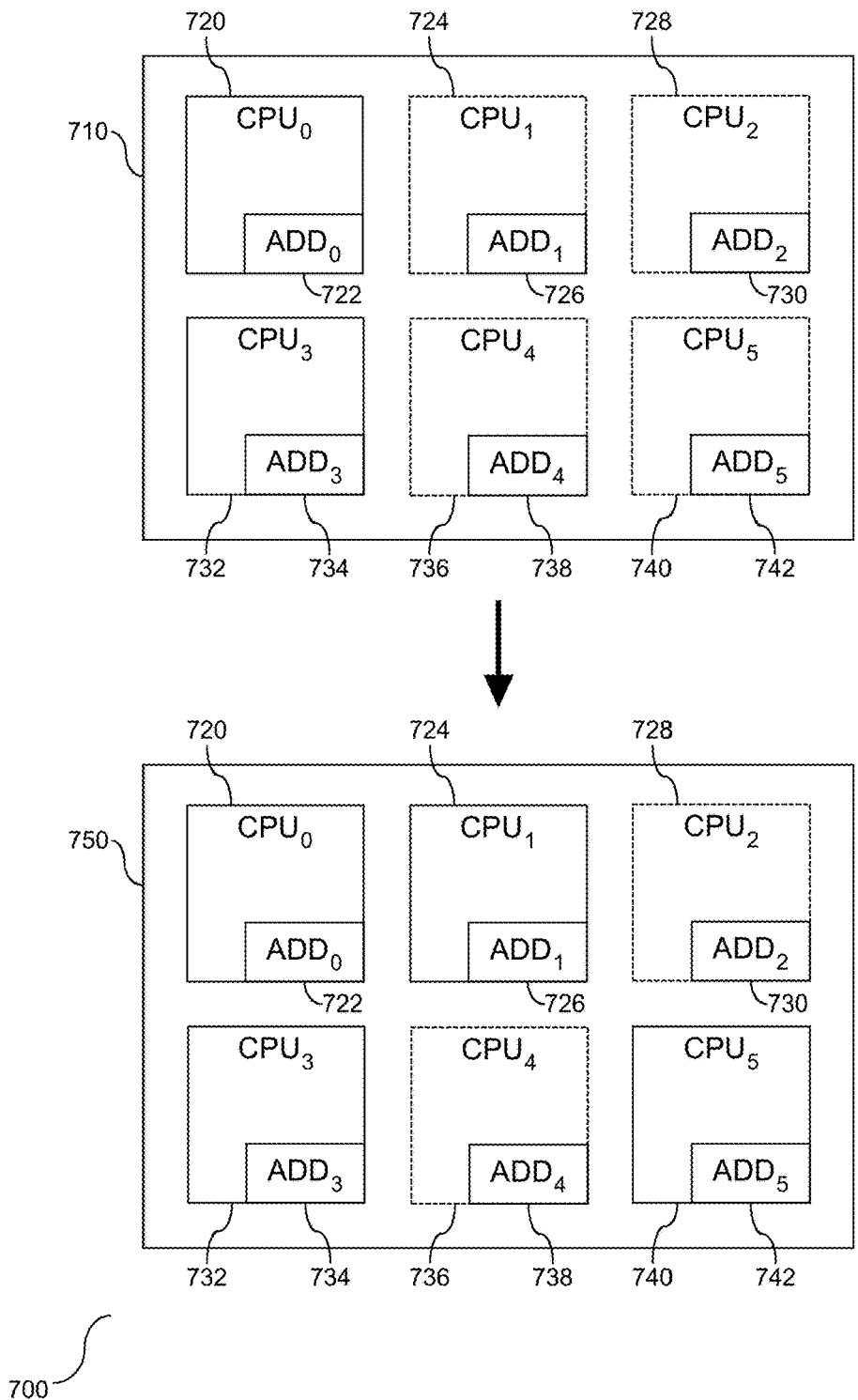
FIG. 7 depicts a block diagram illustrating a soft-product and associated addressable components.

Prior to action on an identified trend, the product that is the subject of the analysis is in a first state, and following the action, the product is physically transformed to a second state, different from the first state. Referring to FIG. 7, a block diagram (700) is provided illustrating a soft-product and associated addressable components. A soft product is referred to herein as a product with addressable components that can be activated through their respective addresses to optimize the configuration of the product. The soft product configuration is brought into the compliance model so that proposals may efficiency be communicated into firm orders with coded communications applied to the separately addressable components.

As shown, the product includes a first state (710) relating to product component setting of the soft-product prior to application of the compliance model to the supply chain changes. The soft-product (710) is shown with six separately addressable components. More specifically, each of the addressable components shown herein are processors, although in one embodiment the component may be in a different form and as such is not limited to a processor. As shown, $CPU_0$ (720) has an address, $Addres_0$ (722), $CPU_1$ (724) has an address, $Address_1$ (726), $CPU_2$ (728) has an address, $Address_2$ (730), $CPU_3$ (732) has an address, $Address_3$ (734), $CPU_4$ (736) has an address $Address_4$ (738) and $CPU_5$ (740) has an address, $Address_5$ (742). In the first state, $CPO_0$ (720) is shown in an active state, as represented with solid lines, and $CPU_3$ (732) is also shown in an active state, as represented with solid lines. The remaining processors, $CPU_1$ (724), $CPU_2$ (728), $CPU_4$ (736), and $CPU_5$ (740) are shown in an inactive state, as represented with dotted lines. Accordingly, in the first state a selection of the addressable components are shown activated, with the remaining components shown as inactive.

The second state (750) relates to product component setting of the soft-product after application of the compliance model to the supply chain, and more specifically after receiving one of more commands at specified components addresses to change a state of those components. Prior to application of the compliance model, two of the addressable components are shown in an active state, namely $CPU_0$ (720) and $CPU_3$ (732). Following application of the compliance model two more addressable components are shown in an active state, namely $CPU_1$ (724) and $CPU_5$ (740). The remaining components remain inactive, namely $CPU_2$ (728) and $CPU_4$ (736). Although the second state (750) shows the state of two additional processors activated, this is not a limiting example. In one embodiment, the second state may de-activate one or more a previously activated processors, or a different selection of active and inactive processors. Accordingly, the example shown herein demonstrates the ability to change the state of a physically component, and more specifically changing the activation status of one or more addressable components subject to the compliance model.

The filter and compliance models communicate with the first and second databases to dynamically change a configuration setting of one or more addressable components in the soft product in the product supply chain that is the subject of the analysis, thereby effectively changing one or more confirmation settings of at least one addressable hardware component. Following step (110), the settings of the addressable components of the product in a first state are identified by the compliance model (112). The variable $X_{Total}$ identifies each of the addressable components (114), and an associated component counting variable is initialized (116). For each addressable component$_X$, the current setting is identified and compared to the setting identified by the compliance model (118). It is then determined if the identified settings match (120). If the settings do not match, a coded command is sent to the address of the component to apply the compliance model setting to the component (122). Receipt of the coded command physically transforms the product from a first state to a second state. Either following a positive response to the determination at step (120) or following the command issuance at step (122), the component counting variable is incremented (124). It is then determined if each of the components have been evaluated based on the compliance model settings (126). A negative response to the determination at step (126) is followed by a return to step (118), and a positive response concludes the product configuration modification. Accordingly, as shown, compliance model data is measured and applied to the product for dynamic configuration of the product through activating or de-activating an associated setting of one or more addressable components.

Figure 8:
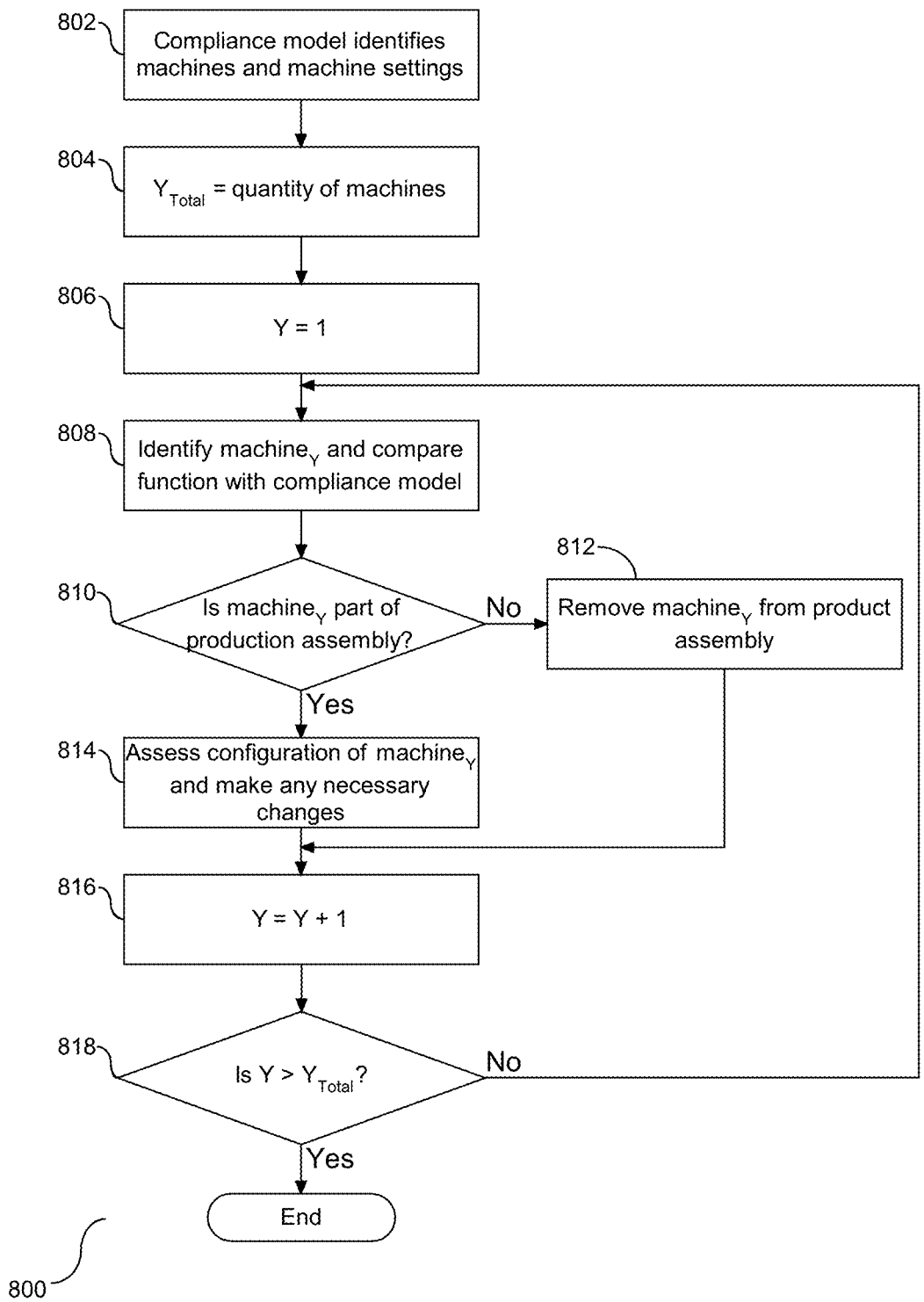
FIG. 8 depicts a flow chart illustrating the trend interpolation and extending the interpolation to the machines employed in the manufacturing process.

As shown in FIG. 1, the product that is the subject of manufacture may be configured with modifiable components, such as processors on demand, memory on demand, etc. By configuring a product with such modifiable components, the product is essentially pre-configured together with expansion capability. However, the modifiable component structure may be employed with the manufacturing process to physically change the manufacturing line. Referring to FIG. 8, a flow chart (800) is provided illustrating employing the trend interpolation from step (110) and extending the interpolation to the machines employed in the manufacturing process. As shown, based on the trend interpolation, a compliance model is employed to identify machines and associated machine setting employed in the product manufacture (802). The variable $Y_{Total}$ is assigned to the quantity of machines employed in the product manufacturing process (804), and an associated machine counting variable, Y, is initialized (806). It is understood that as the product structure is subject to change thereby creating a different product or changing a state of a product, machines may be added to or removed from the manufacturing line. Accordingly, the manufacturing process is assessed to transform the state of the manufacturing line.

Machine$_Y$ in the manufacturing line is identified, and the function of the machine is compared with the compliance model (808). In one embodiment, it is determined if the machine being evaluated is required as a part of the product assembly (810). A negative response to the determination at step (810) is followed by removing the machine, machine$_Y$ from the assembly line for the product manufacture (812). However, a positive response to the determination at step (810) is followed by assessing the configuration of machine$_Y$ with respect to the component being manufactured, and making any necessary changes to machine$_Y$ that are required, as dictated by the compliance model (814). In one embodiment, a change to machine$_Y$ physically transforms a state of the machine so that the machine and the product output are modified. Following either step (812) or step (814), the machine counting variable is incremented (816), and it is determined if all of the machines in the product line have been evaluated (818). A negative response to the determination at step (818) is following by a return to step (808), and a positive response concludes the manufacturing machine evaluation process. As shown herein, the manufacturing line that creates the product may be changed, e.g. changing a state of the manufacturing line. Similarly, in one embodiment, a new machine may be added to the manufacturing line to extend the functionality of the line, and effectively changing a state of the manufacturing line. In one embodiment, a machine may be comprised of two or more components, and the process of changing the manufacturing line may be extended to evaluating components in a machine and remove identified components from the product manufacture. Accordingly, a manufacturing line that is comprised of machine or machine components may be transformed to accommodate the compliance model.

As shown in FIG. 1, a filter model is applied to the proposal database (102). FIG. 2 is a block diagram (200) illustrating an example of filter models. As shown, there are five examples of filters (210), (220), (230), (240), and (250), each of which may be applied to the proposal data (202) and order data (204). Each of the filters pertains to a unique product or feature identifier (260), a channel of trade or customer (270), a geographical region (280), and a time window (290). With respect to the example filter models, the first filter (210) parses proposal data (202) by a filter code (212) and a specific time window (214), and at the same time the first filter (210) parses order data (204) by the same filter code (214) and an identified time window (216). More specifically, the first filter is parsing the databases to mine data with respect to proposals and orders under a specific feature code that became actual orders within a specific time window. A filter model may be selected from a grouping of pre-defined model, or in one embodiment, the user can define a filter model with select definitions therein. Accordingly, the invention should not be limited to the filter models described herein.

As shown in FIG. 2, there are other examples of filter models. For example, the second filter model (220) mines data with respect to proposals and orders placed by a customer designated by a specific name during a specified time window. The third filter model (230) mines data with respect to proposals for all servers during a specified time periods and respective orders for all servers during a specified time period. The fourth filter (240) mines data with respect to proposals associated with specific product numbers in a specific time period that became orders during a specific time period. In this example, the second product was replaced with a new product as shown by the change in one digit of the product identifier. The fifth filter (250) mines data with respect to proposals associated with a specific product number and operating system and a specific time frame that became orders during a second specific time fame. The filter model shown in FIG. 2 is a tool to specify a set of data that should be considered for analysis. The data generated by the filter model combines two sets of data, one set coming from an order backlog repository and a second set coming from a proposal repository. Accordingly, as shown herein, each filter is applied to the two databases to parse through data that fits specified criteria to generate a subset of data.

FIG. 3 is a block diagram (300) illustrating examples of compliance models. The compliance model functions to interpret the subset of data generated by the filter model(s). More specifically, the compliance models apply a compliance algorithm to the subset of generated data in real-time to look for trends as they emerge from the proposal data. The trends are then employed to predict data orders. A compliance model may be selected from a grouping of pre-defined model, or in one embodiment, the user can define a compliance model with select definitions therein. Accordingly, the invention should not be limited to the compliance models described herein.

As shown, there are five compliance models (310), (320), (330), (340), and (350). Each compliance model has an identifier (302) and an associated compliance algorithm (306). In addition, each compliance model utilizes a filter identifier from the filtering models (304), and an action to be employed on one of more of the hardware addressable components (308) following application of the compliance model. For example, the first compliance application (360) checks whether a percentage of orders among proposals associated with the first filter model is less than fifty percent. If the algorithm is valid, an electronic mail message is utilized to send the pertinent information to a designated set of recipients. The second compliance application (370) checks whether an average lead time from proposal to order associated with the second filter is more than two weeks. If the algorithm is valid, an electronic mail message is utilized to send the pertinent information to a designated set of recipients. As shown at (380), the compliance application identifies a projected decrease in the associated order value, and this is followed by an action to selectively de-activate one or more of the addressable components, e.g. change the state of the designated components from active to inactive. This command addresses the compliance application by effectively decreasing the value of the product output. Accordingly, each compliance model is applied in real-time to dynamically look for trends as such trends emerge.

The compliance model is a tool to identify compliance with specified criteria. The compliance algorithms utilized by the compliance model associate a relationship between a proposal dataset and an order dataset. More specifically, each compliance algorithm has an identifier, parses data associated with a filter identifier, and utilizes a compliance algorithm to determine an action to be executed. In one embodiment, the compliance algorithm is a set of criteria for a specified business objective. The action to be executed specifies what needs to take place if the results of the compliance algorithm matches or falls within the specified parameters.

The data represented in the first database (102) may be organized in various structures. In one embodiment, the data is organized in a hierarchical manner referred to herein as a first nested structure. With respect to a product comprised of multiple components, also known as composite products, each of the components may be represented in different tiers in the hierarchy. A root node of a first nested structure of the hierarchy may represent a multi-component product, and each leaf node may represent a product component. Similarly, the proposal data of the second database (104) may also be organized in a hierarchical manner, referred to herein as a second nested structure. A root node of the second nested structure of the hierarchy may represent a multi-component product order, and each leaf node may represent a product order component.

A correlation between product data and proposal data takes place through a hierarchical structural comparison of the first and second nested structures, and specifically the nodes of the first structure are compared with the nodes of the second structure. In one embodiment, the correlation takes place in real-time. By comparing the two nested structure, proposal data is compared to real order backlog data. Resulting correlations from the comparison can be used to make a change in the supply chain or recommendation for a change to the supply chain. Similarly, the correlations can be used to identify product pricing problems, component compatibility problems, as well as identifying the source of the order, and the source of any incompatibility. In one embodiment, the comparison provides correlation data to identify trends and patterns associated with the product(s). For example, the correlation data may pertain to historical product purchases and shipments so as to assess adoption rates in view of order configurations. Accordingly, the real-time correlation and associated correlation data functions to affect changes to a product supply chain in real-time.

As shown in FIGS. 1-3, replacement components are identified, together with one or more replacement of components and associated replacement conditions. In one embodiment, the aspect of replacing components may include changing the state of a component, e.g. active to inactive or inactive to active, etc. FIG. 4 is a block diagram (400) illustrating a chart for modification of a state of one or more defined components and/or replacement of a defined component. The chart is one embodiment for illustrating modification of a state of components or replacement of the component, and the invention should not be limited to this embodiment. As shown, there are four columns, with a first column (410) representing a product, a second column (420) representing a component identifier, a third column (430) representing a priority for replacement of the product, a fourth column (440) representing conditions for replacement, and a fifth column (450) representing modification of a state of the component. More specifically, the chart shows which parts are replaceable and in which order replacement should be attempted. The priority, as referenced in the second column (420), may be based upon different factors, including aspects of importance and optional parts. Based upon the example shown herein, three components (460), (462), and (464) are identified as replaceable, and one component (466) is identified as eligible for a state modification at (456). In one embodiment, the priority may be controlled by dynamic conditions of the current system configuration. As shown in this example, there is a designation in the priority column for a part that is not replaceable. Accordingly, the chart shown herein is a tool to organize information pertaining to replacement components.

In a multiple component system, some or all of the components may be replaced with a replacement part. As shown in FIGS. 1-4, product data is compared with order proposal data in order to derive a relevant correlation between the data sets. Such correlations can be used to make changes to a product supply chain. Accordingly, a derived historical relationship between the data sets may contribute to a projection of future product sales based on current product proposals.

Figure 5:
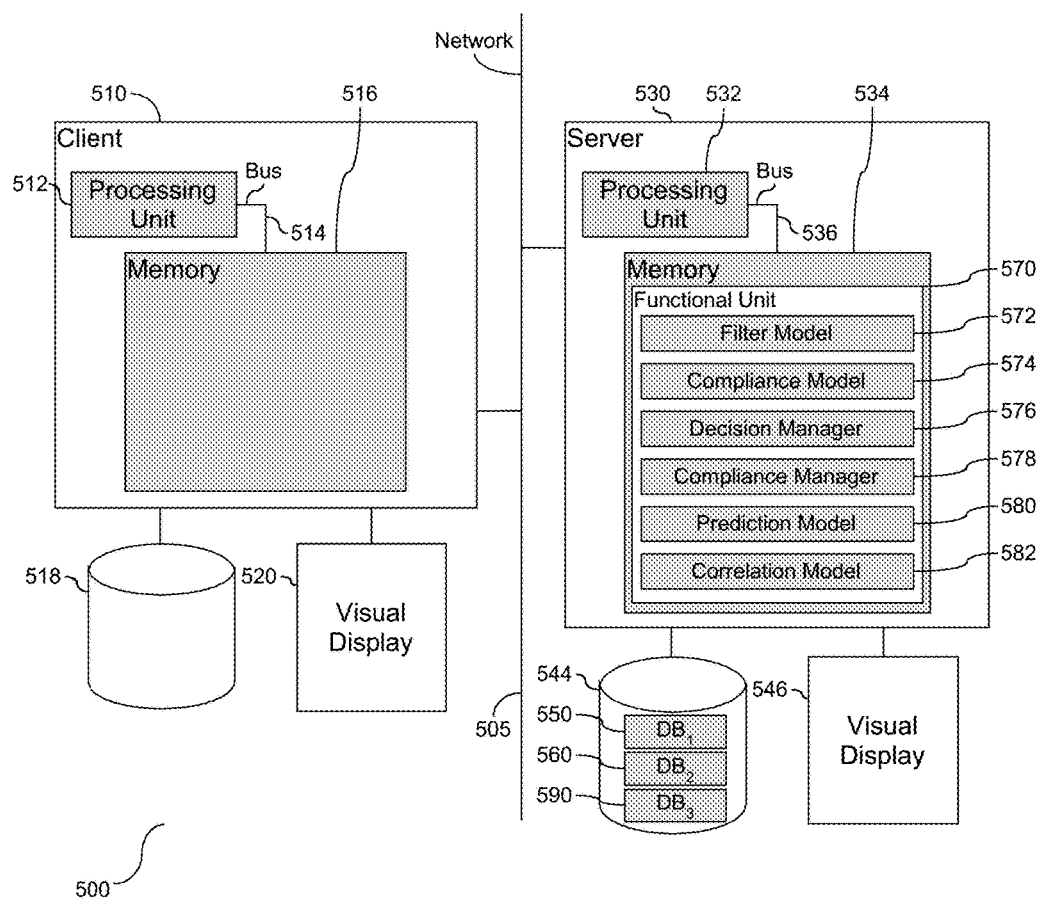
FIG. 5 depicts a block diagram illustrating tools embedded in a computer system to support deriving correlations between the data sets and applying a measurement associated with the correlation to changes in the product supply chain.

FIG. 5 is a block diagram (500) illustrating tools embedded in a computer system to support deriving correlations between the data sets and applying a measurement associated with the correlation to changes in the product supply chain. For illustrative purposes, a computer system is provided with a client machine (510) in communication with a server (530) across a network (505). The client machine (510) is provided with a processing unit (512) in communication with memory (516) across a bus (514). In one embodiment, client machine (510) is in communication with local data storage (518) and a visual display (520).

The client machine (510) is shown in communication with the server (530) across the network (505). In one embodiment, the server (530) is provided with a processing unit (532) in communication with memory (534) across a bus (536). As shown herein, the server (530) is in communication with at least one storage device (544) and a visual display (546). In one embodiment, the server (530) may be in communication with additional storage devices, and/or additional data centers. The storage device (544) is configured to support at least two databases, including a first database (550) and a second database (560). The first database (550) includes data pertaining to created order proposals, which includes time of submission of the order proposal, and the product associated with the order. In one embodiment, the order proposal is an offer for consideration. The second database (560) includes data pertaining to one or more firm orders, which includes but is not limited to, an offer with consideration attached, as well as orders received and time of receipt of each of the orders.

A functional unit (570) is provided in communication with memory (534); the functional unit (570) supports tools to assess relevant correlations that affect supply chain changes. As shown, the functional unit (570) is provided with a filter model (572), a compliance model (574), a decision manager (576), a compliance manager (578), and a prediction model (580). The filter model (572) functions to apply a correlation to data from both the first database (550) and the second database (560), and specifically to capture related proposal and order data. In one embodiment, the filter model (572) generates a subset of data as input into a correlation model (582), with the input based on an attribute such as a time period, type of order, and geography. In one embodiment, the filter model (572) applies the correlation between a proposal and a corresponding purchase order. Similarly, in one embodiment, the filter model (572) has a dependency between order proposal and firm orders.

The compliance model (574) functions to leverage output from the filter model (572). More specifically, the compliance model (574) functions to measure the correlation between the filter model (572) and specific criteria in real-time and to dynamically apply the compliance model to a transformation of a physical product. In one embodiment, the prediction model (580) is provided in communication with the compliance model (574) and functions to correlate an order proposal with an order backlog in the second database (560). The decision manager (576) functions with the compliance model (574) and applies the correlation measured by the compliance model (574) to changes in the supply chain. Accordingly, filter model (572), compliance model (574), and decision manager (576) function together to affect real-time changes to the supply chain.

A third database (590) is provided in communication with the storage device (544), and is referred to herein as a proposal database. The proposal database (590) functions to tracks sets of proposed order configurations. As these order configurations are in a proposed state, one or more of the proposed order configurations may be formally submitted as an order.

In one embodiment, the order proposal data of the first database (550) is organized in a first logical product configuration in the form of a first hierarchical structure, such as a nested structure. The first hierarchical structure includes a first root node representing a product and each leaf node representing a product component. Similarly, the firm order data of the second database (560) is organized in a second logical configuration in the form of a second hierarchical structure, such as a second nested structure. The second hierarchical structure includes a second root node representing a product order and each leaf node representing a product order component. In one embodiment, the component includes time of occurrence, geography, or customer. The compliance manager (578) of the functional unit (570) communicates with the first and second hierarchical structures of the first and second databases (550) and (560), respectively, to perform a real-time hierarchical structural correlation of the first and second hierarchical structures. The functionality of the compliance manager (578) includes a comparison of at least one node of the first hierarchical structure with at least one node of the second hierarchical structure. Accordingly, the nested configuration of the hierarchical structures supports real-time correlation of data between the first and second databases.

The models and managers function as tools within a unit to support real-time aspects of supply chain changes, including supply change recommendations. As identified above, the filter model (572), compliance model (574), decision manager (576), compliance manager (578), and prediction model (580), hereinafter referred to as tools, function as elements to support supply chain changes and/or supply chain recommendations. The tools (572)-(580) are shown residing in memory (534) local to the server (530). However, the tools (572)-(580) may reside as hardware tools external to memory (534), or they may be implemented as a combination of hardware and software. Similarly, in one embodiment, the tools (572)-(580) may be combined into a single functional item that incorporates the functionality of the separate items. As shown herein, each of the tools (572)-(580) are shown local to the server (530). However, in one embodiment they may be collectively or individually distributed across a network or among multiple machines and function as a unit to evaluate hardware performance. Accordingly, the tools may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
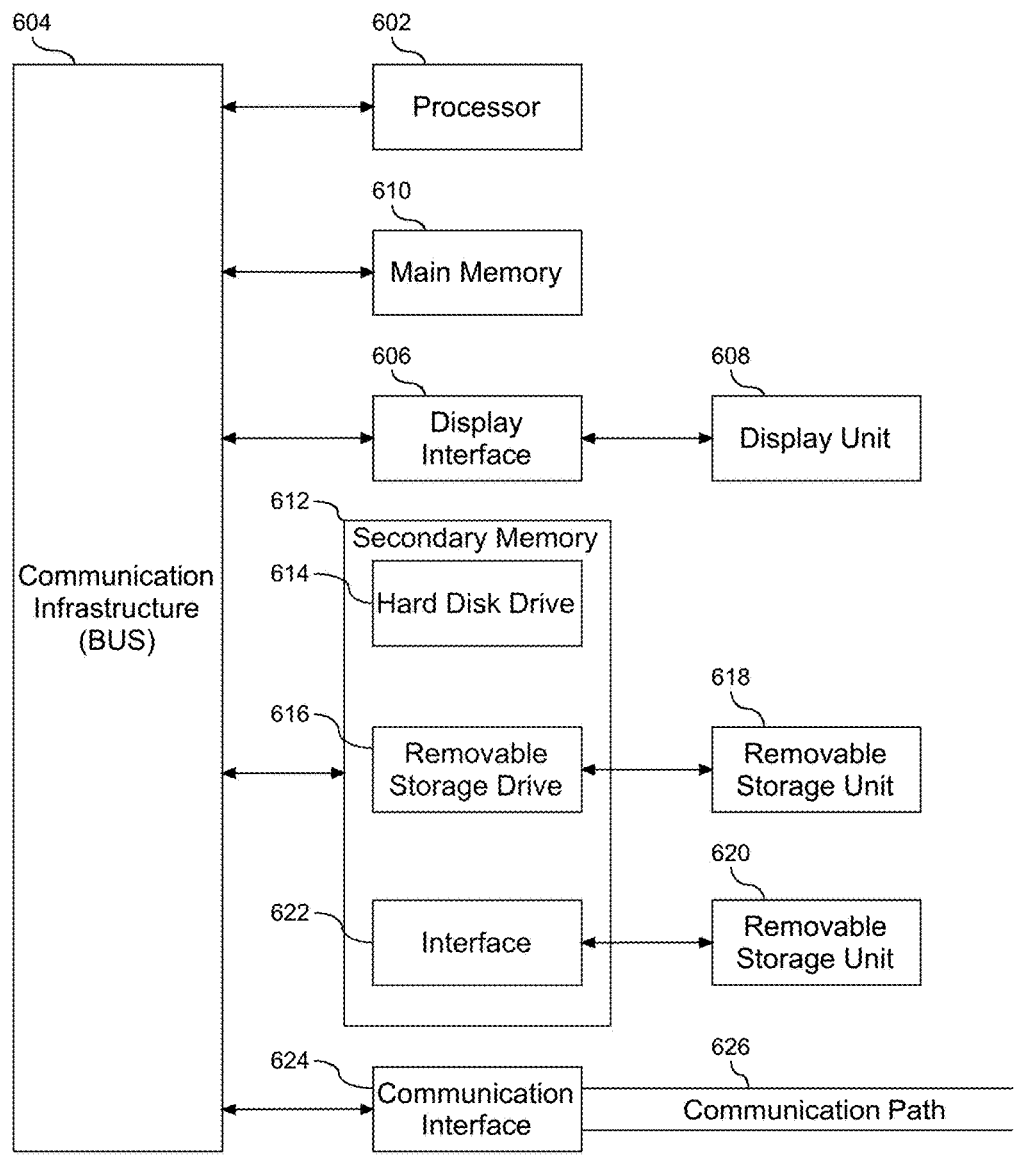
FIG. 6 depicts a flow chart illustrating a process for loading the log from storage and parsing the continuous log for one or more select threads.

Referring now to the block diagram of FIG. 6, additional details are now described with respect to implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by removable storage drive (616). As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) are in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The filtering algorithm associated with the compliance model may take placed on a shared resource with communications supported across a cloud computing environment from the shared resource executing the filtering algorithm to receipt of a command by the hardware addressable component. More specifically, the filtering and command assessment may take place in the shared resources provided by the cloud computing environment, with the issues command forward to the product for modification of a state of the product. In one embodiment, the system shown in FIG. 6 and/or the server (530) shown in FIG. 5 may be a node in a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
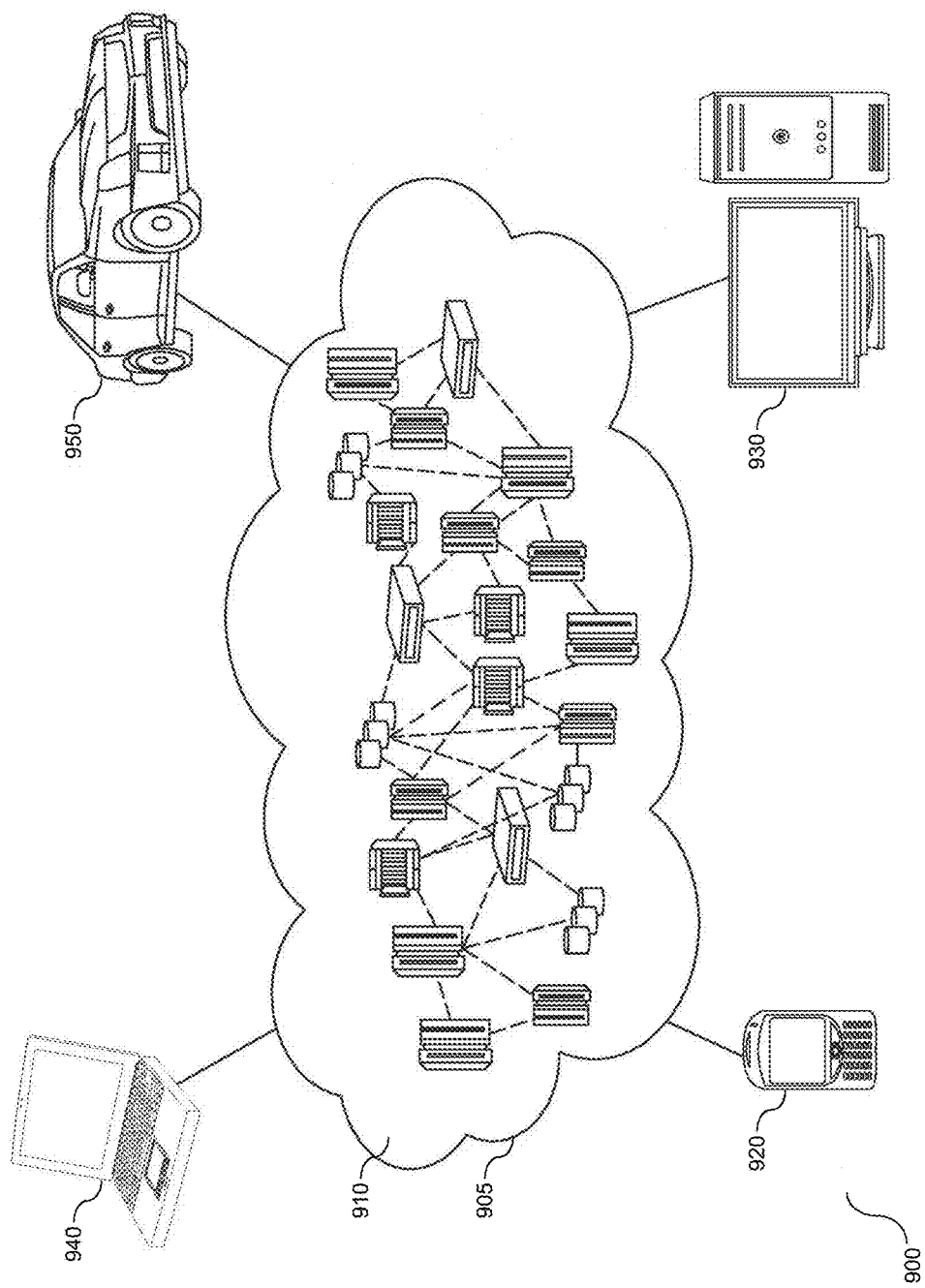
FIG. 9 depicts a block diagram illustrating a cloud computing environment.

Referring now to FIG. 9, an illustrative cloud computing network (900). As shown, cloud computing network (900) includes a cloud computing environment (905) having one or more cloud computing nodes (910) with which local computing devices used by cloud consumers may communicate. Examples of these local computing devices include, but are not limited to, personal digital assistant (PDA) or cellular telephone (920), desktop computer (930), laptop computer (940), and/or automobile computer system (950). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (920)-(950) shown in FIG. 9 are intended to be illustrative only and that the cloud computing environment (905) can communicate with any type of computerized device over any type of network and/or network addressable connection (e.g., using a web browser).

Figure 10:
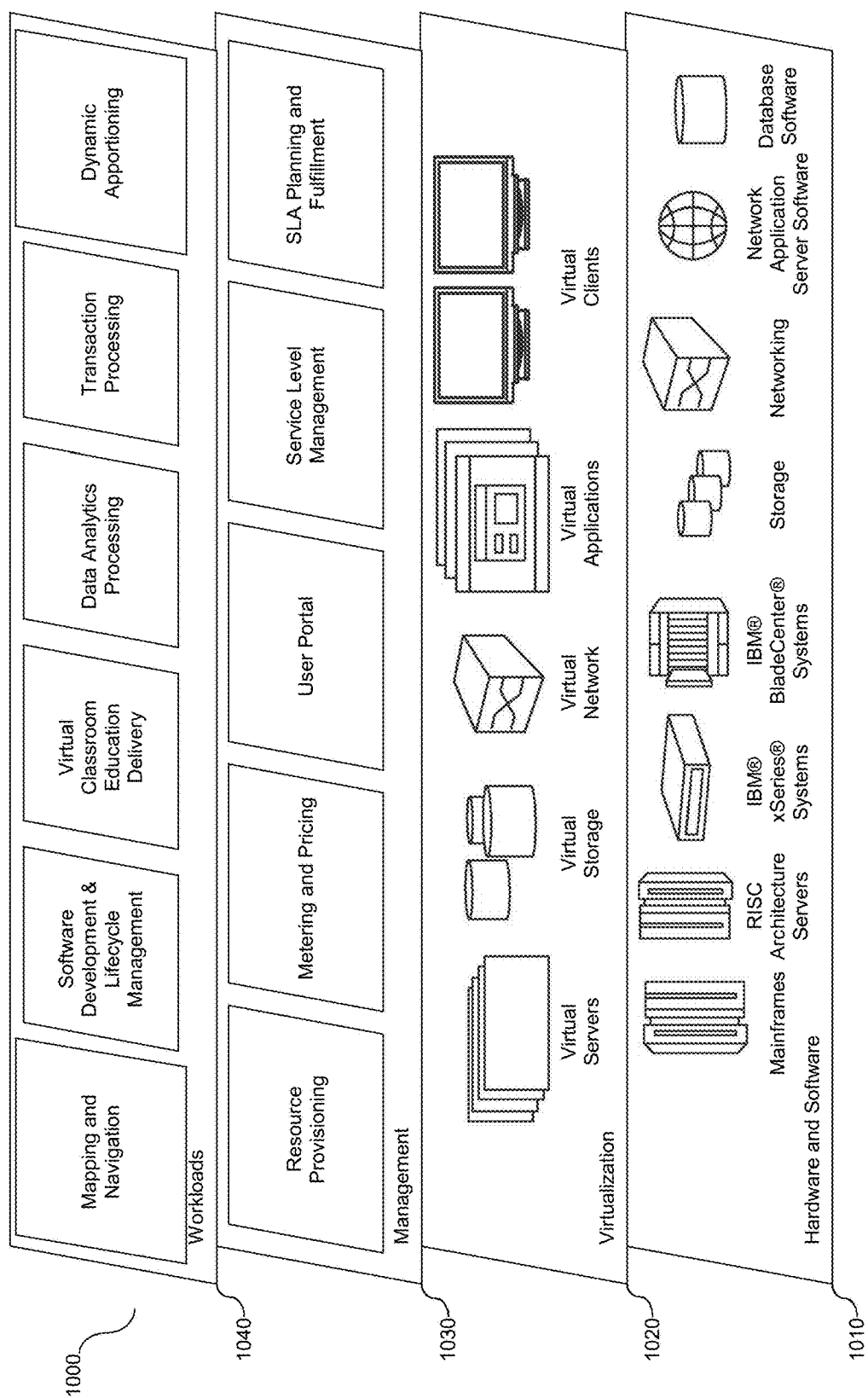
FIG. 10 depicts a block diagram illustrating a set of functional abstraction model layers provided by the cloud computing environment.

Referring now to FIG. 10, a set of functional abstraction layers provided by the cloud computing network of FIG. 6 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040). The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic transformation of product configuration within the cloud computing environment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. More specifically, the details herein pertain to hierarchical representations of product components and product orders. In one embodiment, the product components and/or the product orders may have a different representation or configuration while continuing to support real-time aspects of supply chain changes through physical transformation of a state of one or more physical objects in the supply chain. Accordingly, the scope of protection of this invention is limited only by the following claims and their equivalents.

We claim:

1. A system comprising:
a processor in communication with memory and data storage;
the processor to:
select a product for manufacture, the product including two or more addressable hardware components, and each of the components having an initial setting;
organize proposal data associated with one or more product order proposals and firm order data associated with one or more firm product orders, wherein the proposal data comprises proposed configuration data of at least one of the addressable hardware components, and the firm order data comprises orders received data including component setting data for each of the two or more addressable hardware components;
produce a correlation between the order proposals and the firm order data, including filter the proposal data based on product characteristics and the firm order data based on order characteristics, and compare the filtered proposal data to the filtered firm order data;
measure compliance data according to specified criteria based on the correlation;
generate a command for each of the addressable hardware components based on the measured compliance data;
the processor to apply the command to the product, wherein application of the command identifies a configurable and addressable hardware component of the product, and wherein application of the command sets the identified component based on the measured compliance;
and a first state of the product created from application of the command.

2. The system of claim 1, further comprising a second command to change the product configuration to a second state, including the processor to identify an address of a component directed to each changed configuration, send an instruction to the identified address, the processor to apply the instruction and change a configuration setting of at least one of the addressable hardware components located at the identified address, wherein application of the instruction transforms a physical state of the product from the first state to a second state, the second state having the changed configuration.

3. The system of claim 1, wherein two or more machines are utilized to manufacture the product with the identified components, and further comprising the processor to identify a changed machine configuration setting and the machine employed for the change, and the processor to apply the command to the identified machine, wherein the application creates the product in the first state within the identified changed configuration.

4. The system of claim 3, wherein application of the command includes removal of the identified machine from the product manufacture.

5. The system of claim 3, further comprising the command to change a setting of the identified machine, the changed setting to transform a state of the product from the first state to a second state.

6. The system of claim 3, further comprising the machine to physically transform the product from a first state having the initial component settings to a second state having the changed settings of one or more of the components.

7. The system of claim 1, wherein changed the configuration setting of at least one of the addressable hardware components includes an action selected from the group consisting of: activating a component and deactivating a component.

8. A computer program product to transform a physical product state based on correlation data, the computer program product comprising a computer readable storage device having program code embodied therewith, the program code executable by a processing unit to:
select a product for manufacture, the product including two or more addressable hardware components, and each of the components having an initial setting;
organize, by a processor, proposal data associated with one or more product order proposals and firm order data associated with one or more firm product orders, wherein the proposal data comprises proposed configuration data of at least one of the addressable hardware components, and the firm order data comprises orders received data including component setting data for each of the two or more addressable hardware components;
produce a correlation between the order proposals and the firm order data, including filter the proposal data based on product characteristics and the firm order data based on order characteristics, and compare the filtered proposal data to the filtered firm order data;
measure compliance data according to specified criteria based on the correlation;
generate a command for each of the addressable hardware components based on the measured compliance data; and
apply the command to the product, the application identifying configurable and addressable hardware components of the selected product and setting the components based on the measured compliance, wherein the application creates the product in a first state with the identified configuration.

9. The computer program product of claim 8, further comprising program code to change the product configuration to a second state, including identification of an address of a component directed to each changed configuration, the program code to send an instruction to the identified address, the instruction to change a configuration setting of at least one of the addressable hardware components located at the identified address, wherein application of the instruction transforms a physical state of the product from the first state to a second state, the second state having the changed configuration.

10. The computer program product of claim 8, wherein two or more machines are utilized to manufacture the product with the identified components, and further comprising program code to identify a changed machine configuration setting and the machine employed for the change, and apply the command to the identified machine, wherein the application creates the product in the first state within the identified changed configuration.

11. The computer program product of claim 10, wherein application of the command removes use of the identified machine from the product manufacture.

12. The computer program product of claim 10, further comprising program code to change a setting of the identified machine, the changed setting transforms a state of the product from the first state to a second state.

13. The computer program product of claim 10, further comprising the machine to physically transform the product from a first state having the initial component settings to a second state having the changed settings of one or more of the components.

14. A method comprising:
- selecting a product for manufacture, the product including two or more addressable hardware components, and each of the components having an initial setting;
- organizing, by a processor, proposal data associated with one or more product order proposals and firm order data associated with one or more firm product orders, wherein the proposal data comprises proposed configuration data of at least one of the addressable hardware components, and the firm order data comprises orders received data including component setting data for each of the two or more addressable hardware components;
- producing a correlation between the order proposals and the firm order data, including filtering the proposal data based on product characteristics and the firm order data based on order characteristics, and comparing the filtered proposal data to the filtered firm order data;
- measuring, by the processor, compliance data according to specified criteria based on the correlation;
- generating a command for each of the addressable hardware components based on the measured compliance data; and
- applying the command to the product, the application identifying configurable and addressable hardware components of the selected product and setting the components based on the measured compliance, wherein the application creates the product in a first state with the identified configuration.

15. The method of claim 14, further comprising changing the product configuration to a second state, including identifying an address of a component directed to each changed configuration, sending an instruction to the identified address, the instruction changing a configuration setting of at least one of the addressable hardware components located at the identified address, wherein application of the instruction transforms a physical state of the product from the first state to a second state, the second state having the changed configuration.

16. The method of claim 14, wherein two or more machines are utilized to manufacture the product with the identified components, and further comprising identifying a changed machine configuration setting and the machine employed for the change, and applying the command to the identified machine, wherein the application creates the product in the first state within the identified changed configuration.

17. The method of claim 16, wherein applying the command includes removing use of the identified machine from the product manufacture.

18. The method of claim 16, further comprising changing a setting of the identified machine, the changed setting transforming a state of the product from the first state to a second state.

19. The method of claim 16, further comprising the machine to physically transform the product from a first state having the initial component settings to a second state having the changed settings of one or more of the components.

20. The method of claim 14, wherein changing the configuration setting of at least one of the addressable hardware components includes an action selected from the group consisting of: activating a component and deactivating a component.

* * * * *